(12) United States Patent
Saegmueller et al.

(10) Patent No.: US 10,155,286 B2
(45) Date of Patent: Dec. 18, 2018

(54) DEVICE AND METHOD FOR PRODUCING A GUIDE BEVEL ON A WORKPIECE, IN PARTICULAR ON A CUTTING TOOL

(71) Applicant: Vollmer Werke Maschinenfabrik GmbH, Biberach/Riss (DE)

(72) Inventors: Manfred Saegmueller, Ummendorf (DE); Arndt Hauger, Dornhan-Weiden (DE)

(73) Assignee: VOLLMER WERKE MASCHINENFABRIK GMBH, Biberach/Riss (DE)

( * ) Notice: Subject to any disclaimer, the term of this patent is extended or adjusted under 35 U.S.C. 154(b) by 561 days.

(21) Appl. No.: 14/354,413

(22) PCT Filed: Oct. 25, 2012

(86) PCT No.: PCT/EP2012/004471
§ 371 (c)(1),
(2) Date: Apr. 25, 2014

(87) PCT Pub. No.: WO2013/060461
PCT Pub. Date: May 2, 2013

(65) Prior Publication Data
US 2014/0291307 A1    Oct. 2, 2014

(30) Foreign Application Priority Data

Oct. 26, 2011    (DE) .................. 10 2011 116 974

(51) Int. Cl.
*B23K 26/00* (2014.01)
*B23B 51/00* (2006.01)
(Continued)

(52) U.S. Cl.
CPC .......... *B23K 26/38* (2013.01); *B23K 26/0823* (2013.01); *B23K 26/0853* (2013.01);
(Continued)

(58) Field of Classification Search
CPC ............ B23B 2251/44; B23C 2210/44; B23D 2277/62; B23K 2201/20; B23K 26/0823;
(Continued)

(56) References Cited

U.S. PATENT DOCUMENTS 3,614,909 A * 10/1971 Neuser ............... B23Q 17/2233
33/628
3,731,564 A *  5/1973 Diener .................... B23B 23/00
408/13
(Continued)

FOREIGN PATENT DOCUMENTS

DE    2913931 A1    10/1980
DE    3202697 A1     8/1983
(Continued)

OTHER PUBLICATIONS

International Search Report and Written Opinion in corresponding PCT application (i.e., PCT/EP2012/04471) dated May 27, 2013 (16 pages).
(Continued)

*Primary Examiner* — Dana Ross
*Assistant Examiner* — Ket D Dang
(74) *Attorney, Agent, or Firm* — Taft Stettinius & Hollister LLP (57) ABSTRACT

The invention relates to a method for producing a guide bevel on a workpiece, in particular a cutting tool. The workpiece to be machined is clamped in a clamping device which is rotationally driven about a rotational axis, and at least one laser unit is provided. The clamping device and the laser unit can be moved relative to each other by means of at least one CNC-controlled axis. The laser unit is of a type that is suitable for machining the workpiece by removing material. In order to produce the margin, the laser unit and the clamping device are controlled such that the workpiece (Continued)

in the clamping device is continuously rotated about the rotational axis of the clamping device at least by a specified angular amount while the laser unit and the clamping device are moved relative to each other at least by a specified distance in order to remove material from the workpiece so as to produce the guide bevel.

13 Claims, 4 Drawing Sheets

(51) Int. Cl.
| | | |
|---|---|---|
| *B23K 26/38* | (2014.01) | |
| *B23K 26/08* | (2014.01) | |
| *B23K 31/02* | (2006.01) | |
| *B23K 26/361* | (2014.01) | |
| *B23K 101/20* | (2006.01) | |

(52) U.S. Cl.
CPC .......... *B23K 26/361* (2015.10); *B23K 31/025* (2013.01); *B23B 2251/44* (2013.01); *B23C 2210/44* (2013.01); *B23D 2277/62* (2013.01); *B23K 2201/20* (2013.01)

(58) Field of Classification Search
CPC .. B23K 26/0853; B23K 26/361; B23K 26/38; B23K 31/025
USPC ............ 219/121.72, 121.69, 121.66, 121.81, 219/121.82, 121.84, 121.6, 121.67, 219/121.68, 121.19, 121.2; 408/227, 229, 408/230, 59, 57, 144, 233
See application file for complete search history.

(56) References Cited

U.S. PATENT DOCUMENTS

| | | | | |
|---|---|---|---|---|
| 4,170,726 | A | | 10/1979 | Okuda |
| 4,533,812 | A | | 8/1985 | Lorenz |
| 4,675,501 | A | * | 6/1987 | Klingel ................. B23K 26/04 219/121.67 |
| 4,827,600 | A | * | 5/1989 | Miyano .............. B23Q 3/15706 29/26 A |
| 5,160,824 | A | | 11/1992 | Babel |
| 5,239,160 | A | * | 8/1993 | Sakura ............... B23K 26/0884 219/121.82 |
| 5,873,684 | A | * | 2/1999 | Flolo ........................ B23G 5/06 407/11 |
| 6,585,460 | B1 | * | 7/2003 | Meece ................... B23B 51/02 408/227 |
| 6,930,275 | B2 | * | 8/2005 | Yamazaki .............. B23K 26/08 219/121.67 |
| 2001/0022098 | A1 | * | 9/2001 | Wirz ....................... B23F 23/00 72/17.3 |
| 2002/0173228 | A1 | | 11/2002 | Gunjima et al. |
| 2004/0142644 | A1 | | 7/2004 | Gunjima et al. |
| 2007/0031203 | A1 | * | 2/2007 | Osawa .................... B23B 29/02 408/231 |
| 2009/0114628 | A1 | | 5/2009 | DiGiovanni |
| 2009/0233397 | A1 | * | 9/2009 | Psyk .................. B23K 26/0846 438/68 |
| 2011/0057356 | A1 | | 3/2011 | Low |
| 2011/0097162 | A1 | * | 4/2011 | Gey ....................... B23K 26/38 407/30 |
| 2011/0120982 | A1 | * | 5/2011 | Sepp .................... B23K 26/043 219/121.72 |
| 2011/0220625 | A1 | * | 9/2011 | Pluss .................... B23K 26/063 219/121.72 |

FOREIGN PATENT DOCUMENTS

| | | | |
|---|---|---|---|
| DE | 3809821 A1 | 10/1989 | |
| DE | 4040554 A1 | 7/1992 | |
| DE | 19901530 A1 | 7/2000 | |
| DE | 19901777 A1 | 7/2000 | |
| DE | 10204428 A1 | 9/2002 | |
| DE | 102006005401 A1 | 8/2007 | |
| DE | 102009007437 A1 | 8/2009 | |
| DE | 102010011508 A1 | 9/2011 | |
| DE | 102010011580 A1 | 9/2011 | |
| DE | 202011050208 U1 * | 9/2011 | ............ B23K 26/08 |
| JP | 2004344957 A | 12/2004 | |
| JP | 2007276034 | 10/2007 | |
| JP | 2009006436 A | 1/2009 | |

OTHER PUBLICATIONS

International Preliminary Examination Report in corresponding PCT application (i.e., PCT/EP2012/004471) dated Jan. 24, 2014.
English language abstract of DE102010011580A1.
English language abstract of DE102009007437A1.
English language abstract of JP2009006436A.
English language abstract of DE19901530A1.
English language abstract of DE19901777A1.
English language abstract of DE3809821A1.
SAUER GMBH article "Laser-Komplettbearbeitung von Schneidkanten, Freiwinkeln and Spanleitstufen in PKD/CVD" Diamond Business, vol. 3/2011, Sep. 6, 2011 (6 pages).
English Translation of SAUER GMBH article "Complete laser processing of cutting edges, clearance angles, and chip grooves using PCD/CVD" Diamond Business, vol. 3/2011, Sep. 6, 2011 (6 pages).

* cited by examiner

Fig. 9

DEVICE AND METHOD FOR PRODUCING A GUIDE BEVEL ON A WORKPIECE, IN PARTICULAR ON A CUTTING TOOL

TECHNICAL FIELD

The present invention relates to a method for producing a margin on a workpiece, in particular on a cutting tool, and to a computer-controlled machining device for carrying out the method.

BACKGROUND

A margin, also called a circular land, is understood to mean guide portions on workpieces and cutting tools, such as e.g. boring and milling tools. The margins are crucial for the surface quality of a wall of a bore, for example. In other words, a margin decisively influences roughness measured values such as roughness depth, for example of a bore wall. To illustrate what is meant by a margin, reference is made to FIG. 9.

Figure 9:
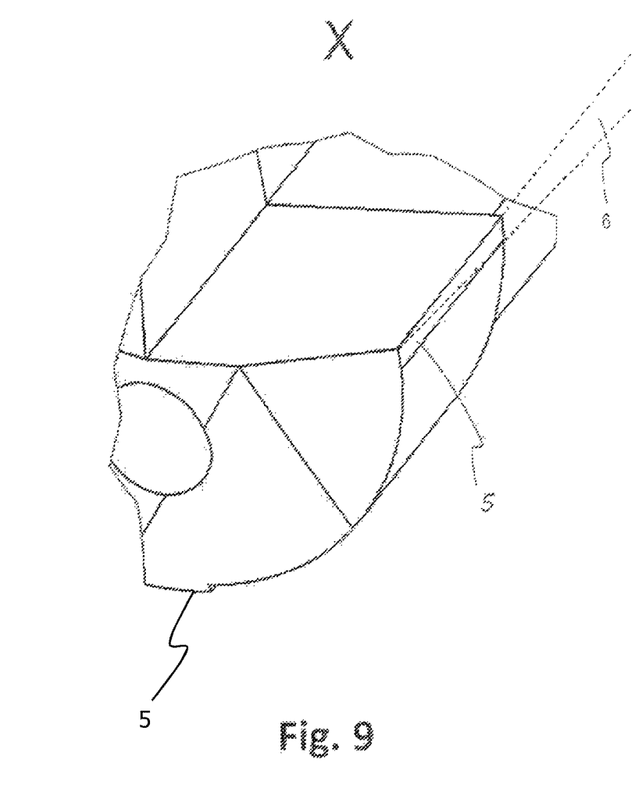
FIG. 9 shows a figure for the general understanding of the invention.

FIG. 9 shows a deep-drilling tool with guide pads 1 and 2, a chip space 3 and a cutting edge 4. In the enlarged detail according to FIG. 9, the guide phase 5 on an edge of the guide pad 2 can be seen. The guide phase 5 has a complex geometry with a relief 6.

Since the guide phase is of great importance for the surface quality of a workpiece to be machined by the cutting tool, the margins have to be produced with high precision. Particularly the fabrication of the margins with high precision has proved to be difficult in practice, because of the complex geometries of the margins with reliefs and undercuts.

Hitherto, margins have been formed on workpieces by means of suitable cylindrical grinding machines. With such a cylindrical grinding machine, variations in the geometries of the circular land or the margin are possible only to a very limited extent, so that the margins produced with previous methods have mostly to be formed cylindrically and cannot have a clearance angle for example.

To produce the margin or circular land, the workpiece to be machined is clamped in the cylindrical grinding machine and subsequently machined by the latter. Since the margins have to be produced with high precision and dimensional accuracy, intermediate inspections, i.e. regular inspection measurements, are necessary. For these, the workpiece—the subsequent cutting tool—has to be unclamped and removed from the cylindrical grinding machine, in order to be able to be clamped in a separate measuring device for the measuring. In other words, the workpiece has to be reclamped for manual measurement during intermediate and final inspections. If further grinding operations are necessary, the workpiece is subsequently clamped in the grinding machine once again, in order to continue the grinding process. The reclamping of the workpiece has an adverse effect on the dimensional accuracy and accuracy to shape of the margin.

Since a grinding wheel is used for grinding the margin, on feed movements of the grinding wheel it is always necessary also to take account of the erosion on the grinding wheel itself, which can have a considerable adverse effect on the production time and the production precision. Particularly in the case of long workpieces, for example reamers, which are to be provided with a margin, the compressive force applied to the workpiece by the grinding with a cylindrical grinding machine has, moreover, an adverse effect on the form and shape of the workpiece.

Generally, devices for machining workpieces by means of laser beams are known from the prior art and disclosed, for example, in the document DE 40 40 554 A1. The machine tool disclosed in this document comprises a housing which is mounted on a machine column and in which a guide tube is arranged so as to be longitudinally displaceable. At the rear end part of the housing is mounted a laser unit, the laser beam of which passes through a focusing optical system and exits from a nozzle head, in which means for supplying at least one fluid to the central exit opening of the laser beam are provided. For laser machining a workpiece, the guide tube is moved horizontally until a nozzle head is immediately in front of the workpiece surface to be machined. The laser unit is activated to perform the removal of material in layers, while the work table performs a combined horizontal movement and a swivelling movement about a vertical axis. To perform cutting machining operations on the workpiece, the laser head is replaced by a cutting tool by means of a tool changer.

The device for machining a workpiece by means of laser beams known from the prior art is, however, not suitable for forming a margin on a workpiece or on a cutting tool, because it is designed for producing cavities in solid workpieces. Such a margin is to be formed on a circumferential surface of the workpiece and has a complex geometry which is not comparable with a simple cavity.

Furthermore, laser machining devices for producing a rotationally symmetrical tool from a blank are known from the prior art and disclosed, for example, in DE 10 2010 011 508 A1.

The laser machining device according to DE 10 2010 011 508 A1 has a control device and a positioning device via which a relative position between a laser head and the tool blank can be set and changed. Via a deflecting device, the laser beam impulses produced by the laser are directed in the region of a pulse area onto the surface of the blank. To produce the cutting edges or chip grooves on the tool blank, the control device specifies for the deflecting device a pulse path for arranging successive impact locations. The course of the pulse path depends on the shape of the pulse area and, in a rectangular pulse area, has a meandering course, which is composed of straight-line partial courses. Pulse areas of round, elliptical or curved shape are also possible. Starting from a starting point, the laser beam impulses are placed along the pulse path until an end point of the pulse path is reached. Upon reaching the end point, a reset movement takes place in the deflecting device and the laser beam impulses are then again placed on the pulse path beginning at the starting point, so that a material removal occurs layer-by-layer. While via the deflecting device, a two-dimensional spatially limited pulse area is machined, the positioning device causes at the same time a relative movement of the pulse area on the surface of the blank. To produce a chip groove or a cutting edge on the blank, the material is removed layer-by-layer in a plurality of removal layers by the movement of the pulse area over the surface of the blank, so that the desired chip groove is formed after considerable material removal.

In the case of the laser machining device disclosed in the document DE 10 2010 011 508 A1, the material is removed layer-by-layer in a plurality of removal layers by the movement of the pulse area over the surface of the blank. During this, the laser beam impulses follow the course of a specified pulse path. Upon reaching an end point of the pulse path, a reset movement takes place, and the next material layer to be removed is removed starting from the starting point of the pulse path.

The laser machining device disclosed in this document removes material layer-by-layer via repeated following of a specified pulse path and in each case always machines the same specified region—a region of a chip groove or a cutting edge—on the workpiece until its completion. The laser machining device according to DE 10 2010 011 508 A1 does not provide for producing a margin on a cutting tool, nor is it suitable for this, since with the disclosed device the geometries required for margins on cutting tools, particularly in the case of tools with a plurality of cutting edges, can only be produced at excessively high time consumption and hence cost.

SUMMARY

It is an object of the present invention to provide a method for producing a margin on a workpiece, with which various workpieces can be provided with a margin quickly and with high precision.

Preferred variants of the method according to the invention emerge in each case from the dependent claims.

In the case of the method according to the invention, the workpiece to be machined is clamped in a clamping device which is rotationally driven about a rotational axis. At least one laser unit is provided for machining the workpiece clamped in the clamping device. The laser unit is of a type that is suitable for machining the workpiece by removing material. The clamping device and the laser unit can be moved relative to each other by means of at least one CNC-controlled axis.

In order to produce the margin, both the laser unit and the clamping device are controlled such that the workpiece in the clamping device is stepwise or continuously rotated at least by a specified angular amount about the rotational axis of the clamping device while the laser unit and the clamping device are moved relative to each other at least by a specified distance in order to remove material from the workpiece so as to produce the margin.

In other words, the workpiece is rotated in the clamping device about the rotational axis of the clamping device while the laser unit and the clamping device are moved relative to each other by a specified distance, i.e. the feed amount, in at least one axial direction of the at least one CNC-controlled axis, in order to remove material from the workpiece to a specified extent. The material removal can be determined by the relative movement between clamping device and laser unit and/or the rotation of the workpiece about the rotational axis. According to the invention, the material removal is achieved, inter alia, by guiding the workpiece or the regions to be machined into the laser beam produced by the laser unit. In doing so, by virtue of the continuous rotation it is possible to guide a region or a plurality of regions of a workpiece, which is or are to be machined, successively into the laser beam, so that the laser beam can act on the workpiece to remove material.

If the workpiece is a cutting tool with a plurality of cutting elements or cutting regions (e.g. on the same radius), the cutting elements can be guided into the laser beam by virtue of the continuous rotation of the workpiece about the rotational axis, so that the laser beam can successively machine the region of the cutting edges or cutting elements on which the margin is to be produced. In most cases, the region is a radially outer surface on a cutting element or a circumferential surface of a cutting tool.

From this, it becomes clear that, with the method according to the invention, in contrast to the prior art according to DE 10 2010 011 508 A1, no repeated following of a specified pulse path is necessary in order to remove material layer-by-layer from the workpiece. In the method according to the invention, the region to be machined is guided into the laser beam under an optionally continuous rotation of the workpiece or tool and a relative movement between laser unit and clamping device, or the laser beam is applied to the rotating workpiece.

Through the relative movement of the clamping device and the laser unit relative to each other and the simultaneously occurring rotation of the workpiece in the clamping device, complex movement patterns of the laser unit and the clamping device relative to each other are possible. Through these movement patterns, it is also possible to produce complex geometries of a guide phase with reliefs, undercuts and clearance angles.

In contrast to the prior art, undesired influences of the tools used, such as the grinding wheels, can be completely eliminated with the method according to the invention, since the margin is formed on the workpiece by the laser beam emitted by the laser unit, without a force being exerted on the workpiece. As a result, in particular also very thin and long workpieces can be provided with a guide phase without deformations.

Certain geometries of the margin on a workpiece, in particular on a cutting tool, may make it necessary for the clamping device, with the workpiece to be machined, in each case to change its rotational direction about the rotational axis by a specified angular amount, i.e. the workpiece is rotated in one direction about the rotational axis by a specified angular amount. Subsequently, a change of direction in the other direction about the rotational axis takes place. With such a control of the clamping device, the production precision can be further increased while avoiding unbalance effect.

Furthermore, the clamping device can be controlled and driven during the production of the margin such that the workpiece in the clamping device continuously rotates about the rotational axis. Here, for example, a rotation of the workpiece about the rotational axis at a rotational speed of greater than 20 rpm or a pivoting movement of the workpiece is conceivable.

In order to measure the workpiece in the clamping device, a measuring device is provided, with which measurements are carried out on the workpiece in the clamping device. The intermediate inspections and also the final inspections can be performed with the method according to the invention in the same clamping device in which the machining of the workpiece also takes place. The reclamping of the workpiece for the measurement, required in the prior art, is thus dispensed with. By dispensing with the reclamping of the workpiece, the precision in the production of the margin can be markedly increased.

After the final inspection of a workpiece, i.e. following the machining and the measurement of a workpiece, the change to a new, unmachined workpiece can proceed in an automated manner. The workpiece change can thus be automated by robots or handling devices after the final inspection or the final measurement of the workpiece has been carried out.

Accordingly, both the measuring operation and the workpiece change can be carried out in an automated manner. As mentioned, any necessary intermediate measurements for inspection and, where appropriate, corrections can also be carried out in an automated manner. With the automated operations made possible by the method according to the invention, a complex workpiece or a cutting tool can be produced in a manless fashion. The method according to the invention thus contributes substantially towards increasing the productivity and the efficiency.

By virtue of the control of the clamping device and the laser unit, and the automated measurement of the workpiece, it is also possible for machine-internal components and machine elements to be independently monitored. As a result, inaccuracies due to the wear on individual machine elements for example, can be independently detected. With the control according to the method of the present invention, a kind of self-inspection of a the machine carrying out the method is achieved.

Preferably, cylindrical or conical workpieces or cutting tools are machined with the method according to the invention. Cutting tools can be provided with helical and/or axially straight-running cutting edges. The complexity of the fabrication of the margins increases according to the shaping of the cutting edges of the cutting tool. Frequently, cutting tools also have exchangeable cutting edges. If the workpiece is a cutting tool, in particular a boring and milling tool, the clamping device and the laser unit can be controlled such that the laser unit removes material successively from individual cutting edges of the cutting tool. In other words, by virtue of the continuous rotation, the cutting edges of the tool to be machined are guided successively through the laser beam produced by the laser unit in order to remove material.

The workpiece can be clamped in the clamping device in various ways. Three variants are conceivable here. On the one hand, the workpiece can be clamped, unsupported (horizontally), or, suspended or upright (vertically), in the clamping device.

On the other hand, in particular in the case of longer and thin workpieces, it is necessary for the workpiece to be clamped by one axial end in the clamping device, and for the workpiece to be supported by its respectively other axial end, for example engaged with a tail centre.

The tail centre can in this case be controlled and configured such that the workpiece is released from the tail centre after completion of the machining, so that a new workpiece can be introduced. For the releasing or engaging, the tail centre or a receiving device driving the tail centre can be driven in the direction of the longitudinal axis of the workpiece. It is conceivable here for the drivable tail centre or the receiving device for the tail centre to be connected to the control of the clamping device and the laser unit.

The tail centre can also be controlled such that a maximum-permissible holding force which is exerted on the workpiece by the tail centre in order to hold the workpiece is not exceeded. The maximum-permissible holding force is calculated in accordance with the dimensions of the workpiece. In the calculation of the maximum-permissible holding force which the tail centre exerts on the workpiece, besides the length and the diameter of the workpiece, also the shape and the material of the workpiece are taken into account in order to avoid deformations and, in particular, distortions in the radial direction on the workpiece, which may arise due to an excessive holding force.

The laser beam produced by the laser unit can be embedded, for its guidance or for more accurate irradiation of the workpiece, in a water jet. In this case, the water jet acts, for example, as a light guide for the laser beam.

As mentioned above, the laser unit and the clamping device execute a relative movement relative to each other at least by a specified distance in order to remove material from the workpiece. With certain geometries of the margin or the circular land, it may be necessary for the specified distance of the relative movement to be executed not all at once, but subdivided into individual partial distances. In other words, a rotation of the workpiece in the clamping device takes place and simultaneously, at certain intervals depending on the need for or extent of the material removal from the workpiece, a relative movement about a partial distance of the specified distance is executed. Accordingly, the relative movement can be executed in individual steps which are determined by the amount of material removal from the workpiece.

In order to be able to move the laser unit and/or the clamping device in different directions, the laser unit and/or the clamping device can be moved by means of at least four CNC-controlled axes. For example, the laser unit and/or the clamping device can be moved relative to each other at least in the direction of an X-, Y-, Z-axis and simultaneously pivoted about one or more of the X-, Y-, Z-axis. Thus all surfaces of a workpiece, i.e. radial and axial surfaces, or individual points on these surfaces, can be machined with the method according to the invention.

The present invention further relates to a machining device, in particular a multiaxis machining device. The machining device comprises a control, in which the method of the above-described kind is implemented, a rotationally driven clamping device for clamping the workpiece, and a laser unit. The clamping device and the laser unit can be moved relative to each other by means of at least one CNC-controlled axis.

Furthermore, the present invention relates to a device for receiving a tail centre. The device can be drivable relative to the workpiece in at least one axial direction in order to hold and release the workpiece. The device is further connected to a control which is designed such that the control determines a maximum-permissible holding force based on the dimensions of the workpiece

BRIEF DESCRIPTION OF THE FIGURES

An embodiment of the present invention is described below with reference to the appended figures, in which.

DETAILED DESCRIPTION

Figure 1:
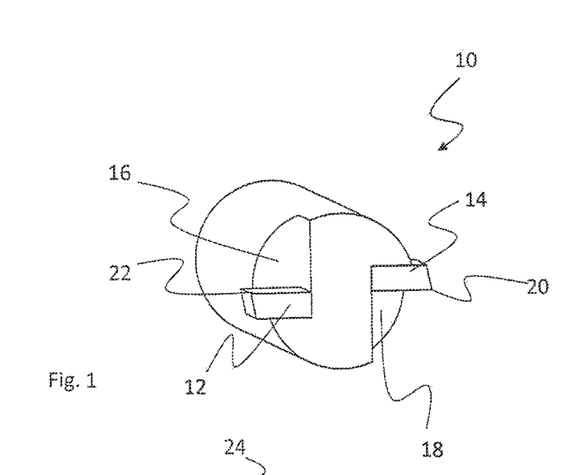
FIG. 1 shows a perspective view of a cutting tool to be machined.

FIG. 1 shows a perspective view of an embodiment of a tool which is machined as a workpiece with the method for producing a margin according to the invention. With the aid of FIG. 1 and also FIGS. 2 to 4, it will be clarified what is meant by a margin or circular land which is to be produced on a cutting tool with the method according to the invention. Furthermore, in this regard, reference is made to the explanations relating to FIG. 9 given in the introduction.

The cutting tool 10 has cutting elements 12 and 14 which are received and fixed in corresponding recesses 16 and 18 in the tool 10, for example by soldering in. The cutting elements 12 and 14 each comprise a cutting edge 20 and 22. The cutting edges 20, 22 lie in a region of the cutting elements 12 and 14 which projects radially outwards beyond the outer circumference of the tool 10.

Figures 2, 4:
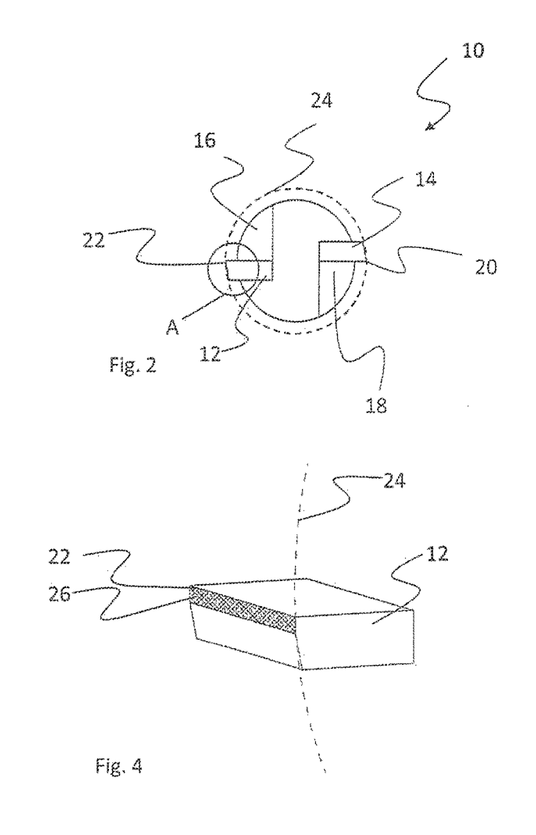
FIG. 2 shows a front view of this cutting tool to be machined.
FIG. 4 shows a perspective view of a cutting element of the cutting tool according to FIGS. 1 and 2.

FIG. 2 shows a front view of the tool 10. In FIG. 2, the cutting elements 12 and 14 with their respective cutting edges 20 and 22 can be seen again. The cutting edges 20 and 22 of the cutting elements 12 and 14 lie on the radius of an imaginary circle 24.

Figure 3:
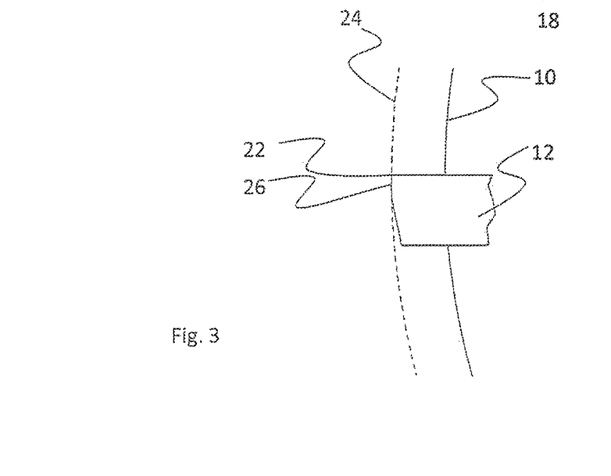
FIG. 3 shows an enlarged detail from FIG. 2.

FIG. 3 shows an enlarged view of the detail A from FIG. 2. In FIG. 3, there can be seen a portion of the tool 10 and a portion of the cutting element 12 with its cutting edge 20. Also shown is a portion of the imaginary circle 24 with specified radius. In the region of the cutting element 12 following the cutting edge 20, the region 26 extends on the radial outer surface of the cutting element 12. In the region 26, a margin is to be formed with the method according to the invention. The region 26 of the margin lies on the same radius of the imaginary circle 24 as the cutting edge 20. Below the margin, a clearance angle is provided by means of the chamfered portion.

FIG. 4 shows a perspective view of the cutting element 12. In FIG. 4, the region 26 which corresponds to the margin is shaded in grey to show it clearly. The region 26 of the margin extends, starting from the cutting edge 20, over a specified portion of the radial outer surface of the cutting element 12. With the margin or circular land 26, the surface quality, i.e. inter alia the surface roughness of a bore wall for example, is influenced.

Figure 5:
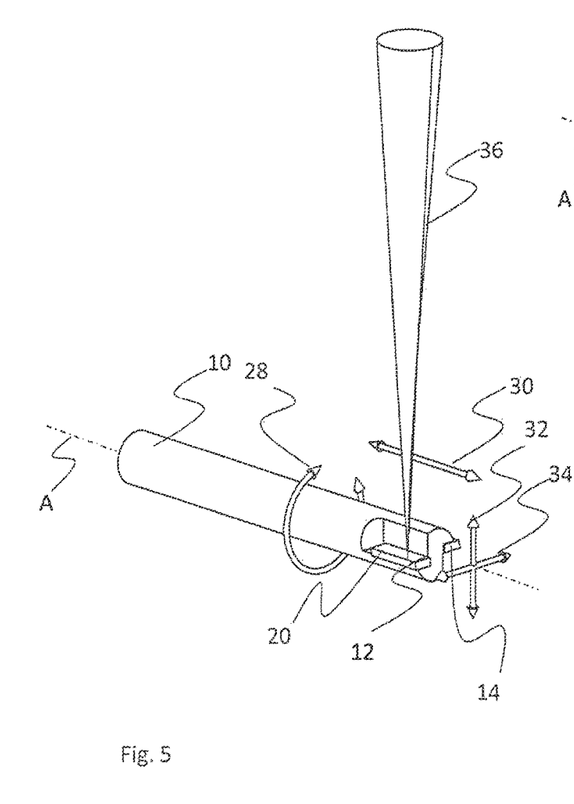
FIGS. 5 to 8 show schematic, perspective views of machining situations of the tool using a laser according to the method according to the invention.

FIG. 5 shows a schematic, perspective view of a machining situation of a workpiece, shown in FIGS. 1 to 4, using the method according to the invention.

The tool 10 is in this case clamped as a workpiece in a clamping device (not shown) and can be continuously rotated in the direction of the arrow 28 about a rotational axis A of the clamping device. Moreover, the tool 10 can be moved relative to the laser beam 36 at least in the directions of the arrows 30, 32, 34 (X-, Y-, Z-direction) via the drivable clamping unit. Furthermore, a laser unit (not shown), which produces the schematically indicated laser beam 36, can also be moved relative to the tool 10 in the directions of the arrows 30, 32, 34. In other words, a relative movement between the tool 10 in the clamping device (not shown) and the laser beam 36 produced by a laser unit (not shown) can be executed while the tool 10 continuously rotates.

To produce the margin or circular land on one of the cutting elements 12 and 14 in a region 26 (FIGS. 3 and 4) following the cutting edge 20, the tool 10 is continuously rotated about the rotational axis of the clamping device and rotates, for example, at a rotational speed of greater than 20 rpm, or is pivoted. Through the continuous rotation of the tool 10, the cutting elements 12 and 14 are successively guided through the laser beam 36, during which the laser beam 36 removes material from the region 26 in order to be able to form the margins. The cutting elements 12 and 14, which lie on the same radius (FIG. 2), thus pass through the laser beam 36 owing to the rotation, and the laser beam 36 acts successively on the cutting elements 12 and 14 so as to produce the margins.

In addition to the continuous rotation of the tool 10, either the tool 10 (via the clamping device not shown) and also the laser unit (not shown) producing the laser beam 36 can be moved relative to each other at least in the directions of the arrows 30, 32, 34. The relative movement of the laser unit and the clamping device achieves the effect that the laser beam 36 can act, from different angles and positions, on the cutting element 12 and 14 to be machined. In other words, the tool 10 is continuously rotated about the rotational axis while, through a relative movement between the laser 36 and the tool 10, the laser 36 is guided along the region 26 (FIGS. 3 and 4) of the cutting elements 12 and 14 so as to produce the margins. The drive of the clamping device and of the laser unit is preferably effected via one or more CNC-controlled axes.

By virtue of the continuous rotation of the tool about its rotational axis, the laser beam acts substantially tangentially on the region 26 (FIGS. 3 and 4) of the cutting elements 12 and 14 to be machined, which contributes, particularly in the case of tools with a plurality of cutting elements 12 and 14 or cutting edges, towards a quick and successive production of the geometries on the individual cutting elements 12 and 14 required for a margin.

Naturally, with the method according to the invention, it is also possible to machine tools with a cutting edge or a cutting element and tools with more than two cutting edges or cutting elements.

Figure 6:
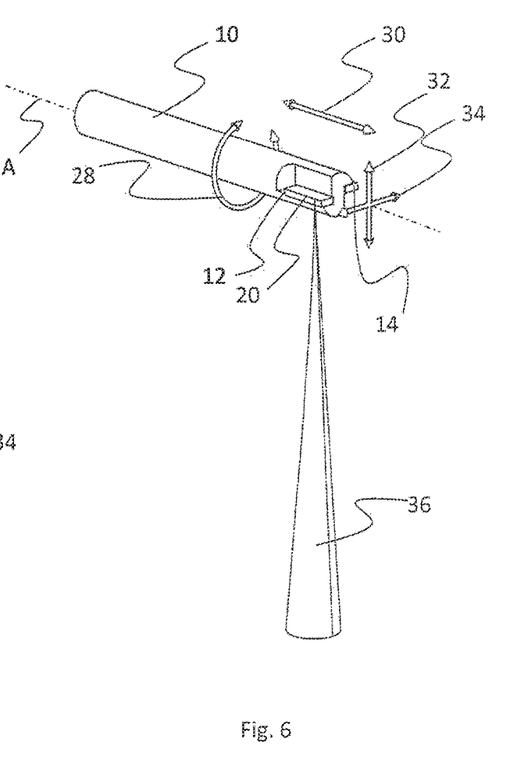
Figures 7, 8:
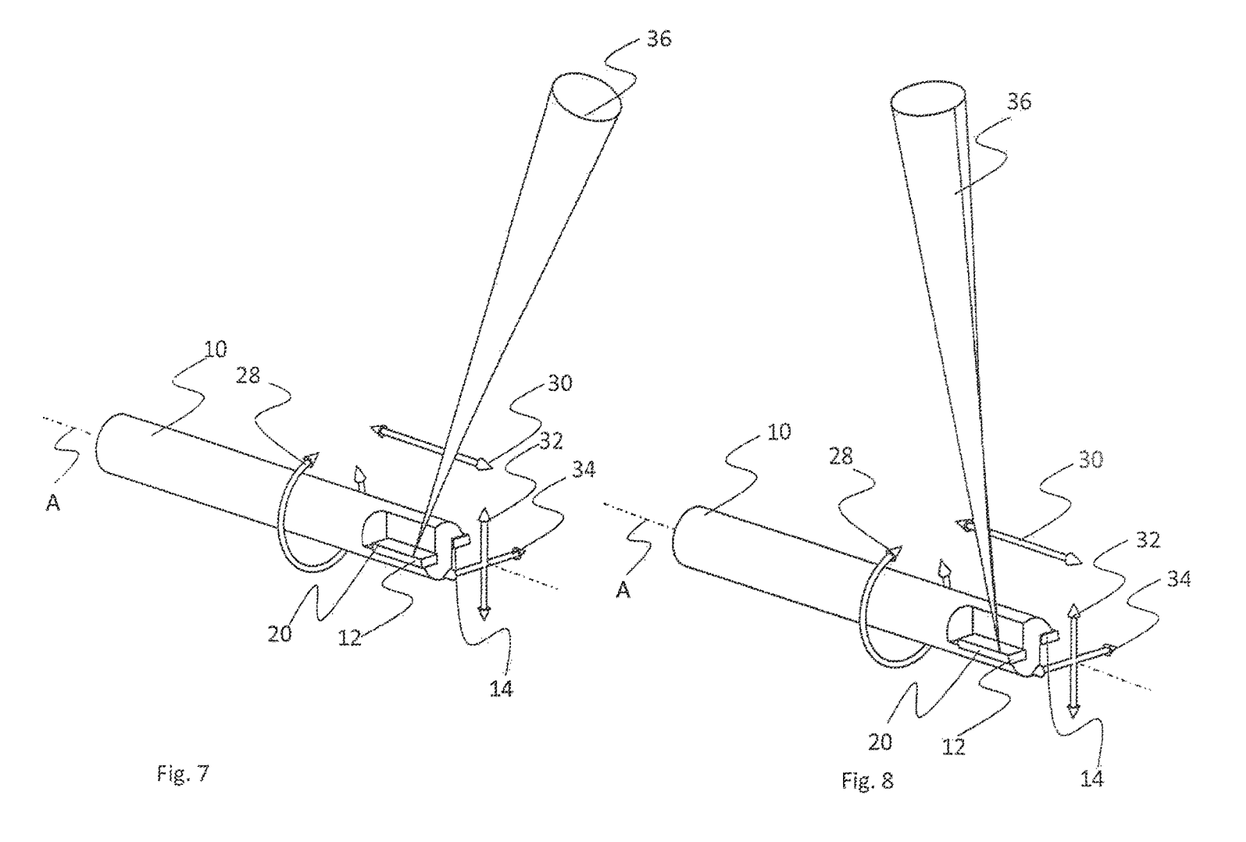

FIGS. 6 to 8 correspond largely to FIG. 4, but show that a relative movement between the clamping device and the laser unit is possible and the laser beam can also strike the workpiece to be machined, at different angles.

FIGS. 5 to 8 show, besides the different possibilities for bringing the laser beam 36 onto the workpiece (tool) 10, additionally that the laser beam 36 is always represented by a cone. As a result, on the one hand the focusing of the laser beam onto the machining location is indicated, but on the other hand also the possibility that the laser beam can execute a rotating movement.

In summary, it can be concluded that a markedly improved possibility for overcoming the relatively difficult problem of creating a circular land on a tool is obtained with the invention. In particular given the increasingly complicated workpiece geometries which are required for the time-saving machining of complex workpiece geometries, the present invention offers considerable advantages.

The invention claimed is:

1. Method for producing a margin on a workpiece, wherein the workpiece is a cutting tool, wherein the workpiece to be machined is clamped in a clamping device which is rotationally driven about a rotational axis, and at least one laser unit is provided, wherein the clamping device and the laser unit are operable to be moved relative to each other by means of at least one CNC (computer numerical control)-controlled axis, and wherein the laser unit is of a type that is suitable for machining the workpiece by removing material, and wherein in order to produce the margin, the laser unit and the clamping device are controlled such that the workpiece in the clamping device is rotated about the rotational axis of the clamping device at least by a specified angular amount while simultaneously the laser unit and the clamping device are moved relative to each other at least by a specified distance in order to remove material from the workpiece so as to produce the margin, wherein the margin extends over a specified portion of the radial outer surface of the workpiece to be machined or a region of the margin extends over a specified portion of the radial outer surface of a cutting element of the workpiece, wherein in the specified portion of the radial outer surface of the workpiece or the specified portion of the radial outer surface of the cutting element of the workpiece, material is removed by means of a laser beam of the laser unit so as to produce the margin, wherein at least one of the at least one laser unit and the clamping device is movable relative to the other in the direction of one or more of an X-, Y-, Z-axis and simultaneously pivotable about one or more of the X-, Y-, Z-axis.

2. The method according to claim 1, wherein the clamping device is controlled and driven during production of the margin such that the workpiece in the clamping device continuously rotates about the rotational axis.

3. The method according to claim 1, wherein a measuring device is provided, with which measurements are carried out on the workpiece in the clamping device.

4. The method according to claim 3, wherein, following the machining and the measurement of the workpiece, the change to a new, unmachined workpiece is performed in an automated manner.

5. The method according to claim 1, wherein the clamping device and the laser unit are controlled such that the laser unit removes material successively from individual cutting edges of the cutting tool.

6. The method according to claim 1, wherein the workpiece is clamped, unsupported, in the clamping device.

7. The method according to claim 1, wherein the workpiece is clamped by one axial end in the clamping device, and is engaged by its other axial end with a tail centre.

8. The method according to claim 7, wherein the tail centre is controlled such that the workpiece is released from the tail centre after completion of the machining of the workpiece.

9. The method according to claim 7, wherein the tail centre is controlled such that a maximum-permissible axial holding force which is exerted on the workpiece by the tail centre is not exceeded, the maximum-permissible axial holding force being calculated in accordance with one or more dimensions of the workpiece.

10. The method according to claim 1, wherein the workpiece is clamped, suspended or upright, in the clamping device.

11. The method according to claim 1, wherein the laser beam produced by the laser unit is embedded, for its guidance, in a water jet.

12. The method according to claim 1, wherein the specified distance by which the laser unit and the clamping device can move relative to each other is subdivided into a plurality of partial distances.

13. The method according to claim 1, wherein at least one of the at least one laser unit and the clamping device is moved by means of at least four CNC-controlled axes.

* * * * *